United States Patent [19]
Ruckh et al.

[11] Patent Number: 5,539,199
[45] Date of Patent: Jul. 23, 1996

[54] METHOD FOR DETECTING OBJECTS IN A MONITORED AREA

[75] Inventors: Rainer Ruckh, Süssen; Martin Argast, Hülben, both of Germany

[73] Assignee: Leuze electronic GmbH + Co., Owen-Teck, Germany

[21] Appl. No.: 390,584

[22] Filed: Feb. 17, 1995

[30] Foreign Application Priority Data

Feb. 19, 1994 [DE] Germany ............................ 44 05 376.2

[51] Int. Cl.⁶ .................................................... G01V 9/04
[52] U.S. Cl. ......................................... 250/222.1; 340/555
[58] Field of Search ................................... 250/221, 222.1, 250/222.2; 356/4.07, 141.1–141.3; 340/555–557, 435, 436; 180/167

[56] References Cited

U.S. PATENT DOCUMENTS

| 5,247,296 | 9/1993 | Spies ........................................ 340/555 |
| 5,313,060 | 5/1994 | Gast et al. ............................... 250/221 |

FOREIGN PATENT DOCUMENTS

| 0520247 | 6/1992 | European Pat. Off. . |
| 89 12 983 U | 3/1990 | Germany . |

OTHER PUBLICATIONS

Fujii et al., 'Sub-step Infrared Range Estimation for a Mobile Robot', *Proceedings of the 1992 IEEE/RSJ International Conference on Intelligent Robots and Systems*, vol. 3, 7–10, Jul. 1992, IEEE New York, NJ, pp. 2041–2046.

*Primary Examiner*—Edward P. Westin
*Assistant Examiner*—Que T. Le
*Attorney, Agent, or Firm*—Spencer & Frank

[57] ABSTRACT

A method is provided for detecting objects located in or entering into an area to be monitored with a device including a transmitter, a receiver and an evaluation unit. A transmitted beam emitted by the transmitter transversely to the radiation direction of the transmitted beam is guided inside the area. For different orientations of the transmitted beam, the distances of the objects from the device are detected and these measured position values are stored in the evaluation unit. For detecting objects of a particular shape the measured position values for the respective object are compared with set values, which are calculated in the evaluation unit from the shape of the object when in a predetermined position in the area to be monitored. An object having a defined shape is considered to have been recognized when a minimum number N of the measured position values falls around the set values within at least one tolerance band T. The minimum number N of the position values and the width of the tolerance band T are selected in the evaluation unit as a function of the dispersion of the measured position values.

8 Claims, 5 Drawing Sheets

METHOD FOR DETECTING OBJECTS IN A MONITORED AREA

CROSS-REFERENCE TO RELATED APPLICATIONS

The present application claims the right of priority with respect to German application No. P 44 05 376.2 filed on Feb. 19, 1994 in Germany, the disclosure of which is incorporated herein by reference.

BACKGROUND OF THE INVENTION

The invention relates to a method for detecting an object located in or entering an area to be monitored by a device including at least one transmitter, at least one receiver and an evaluation unit, wherein measured position values derived from reception of reflection of the transmitted beam in the monitored area are stored in the evaluation unit.

A monitoring device of this type is disclosed in German Patent No. 41 19 797 A1, wherein the objects within an area to be monitored are detected in a contactless manner. For this purpose, the area to be monitored is bounded by a reference area consisting of an arbitrary material. A device comprising a transmitter, a receiver and an evaluation unit is used to monitor the area, the so-called protective field. The device is embodied as a light scanner which includes a deflection unit along the area to be monitored for guiding the transmitted light beam. The distance of a reference surface from the device is measured with the light scanner. A measured distance value is compared with a set value in the evaluation unit. If the distance value agrees with the set value, within a tolerance range, and the light output occurring at the receiver exceeds a minimal value, a signal "protective field is unoccupied" is issued.

When an object enters the area to be monitored, the beam path between the device and the reference surface is interrupted and the distance value of the object from the device is registered in the evaluation unit. If the distance value falls outside of the tolerance range or if the light output occurring at the receiver falls below the minimum value, the signal "protective field occupied" is issued.

The advantage of this method lies in that a large degree of detection assurance can be achieved by evaluation of the measured distance values and the signal level at the receiver.

However, the method has limitations, particularly if objects are disposed very close in front of the reference surface. It is possible in this case that because of fluctuations of the measured values, the distance values for the object or the reference value registered in the device are equal or possibly are even greater for the object than for the reference surface, so that the object can no longer be detected.

Fluctuations of the measured value can be caused by faulty components, aging of the components or the like. The effect is even increased if the object and the reference surface have almost the same reflection capability, so that the received amplitudes are almost identical.

A reflection-locating system having a transmitter, a receiver and an evaluation unit is disclosed in German Patent DE 39 33 437 C2. This system scans a region with its transmission/receiving beam and determines the distance from a target object located in the region via the echo delay for the respective instantaneous beam directions. By means of a change in the beam direction, a series of distance measuring values corresponding to a change in the profile (contour) of the object is created. These values are received by and stored in a signal processor. The signal processor performs additional processing to conduct a more thorough analysis of object-specific signal contents for target identification.

A laser light sensor is disclosed in German Patent DE 36 22 421 which has a transmission light beam that is guided by optical devices within a spatial region in order to scan workpieces and the like. The transmission light beam is steered in a number of pre-programmable spatial directions, for which a predetermined receiving signal allocated to an object is stored as a reference value. To determine whether an object is present in a particular spatial region, the received signals are compared with the reference values.

SUMMARY OF THE INVENTION

It is an object of the invention to provide a method for detecting objects in an area to be monitored which guarantees assured detection even with large fluctuations of the measured values of the position of the object.

The above and other objects are accomplished in accordance with the invention by the provision of a method for detecting an object located in or entering into an area to be monitored with a device including a transmitter for emitting a beam, a receiver for receiving reflections of the beam from an object in an area to be monitored and an evaluation unit for producing measured position values from the received beam reflection, each measured position value representing a distance of the object from the device and an angular position of the object relative to the device, the method comprising: projecting the emitted beam into a predetermined position in the area to be monitored; receiving reflections of the beam from an object in the area to be monitored; producing measured position values from the received reflection; storing the measured position values in the evaluation unit; detecting an object of a particular shape by steps including; comparing the measured position values for the object with set values calculated in the evaluation unit for the particular shape of the object in a predetermined position in the area to be monitored; and indicating a recognition of the object of particular shape when a minimum number N of the measured position values falls within at least one tolerance band T from the set values, wherein the minimum number N of the measured position values and a width of the tolerance band T are selected in the evaluation unit to be of the same order of magnitude as a dispersion of the measured position values; and detecting an object which, in a beam path of the emitted beam, is disposed in front of a reference object of a defined shape and wherein the dimensions of the object are less than the dimensions of the reference object, by steps including: defining a fixed point F in the course of detecting the object which has a measured position value representing the closest distance between the object and the device; defining tolerance bands $T_1, T_2, T_3$ in the area to be monitored from the fixed point F in a direction toward greater distances from the device, wherein the tolerance bands $T_1, T_2, T_3$ have shapes adapted to the shape of the reference object; storing a number of the measured position values falling into the respective tolerance bands $T_1, T_2, T_3$ in the evaluation unit; indicating a detection of the object in front of the reference object when the number of measured position values in the tolerance band $T_1$ containing the fixed point F is less than the minimum number N for detecting the reference object and greater than a minimum number M, wherein M<N, and when the sum of the measured position values in the other tolerance bands $T_2$ or $T_3$ is greater than the minimum number N for detecting the reference object.

The basic concept of the invention is that no evaluation of individual measurements is performed for detecting the object and, instead, a plurality of measured position values corresponding to the shape of the object to be measured is used for detecting the object. Known information regarding the geometry of the object is employed in the definition of the tolerance bands.

The area to be monitored is scanned, preferably periodically, by the transmitted beam of the transmitter. For evaluating the measured position values in accordance with the method of the invention, it is useful to employ respective measured position values within a set period. Reporting of the measured position values over several periods is not required. This is of particular advantage when it is required to detect objects which move within the area to be monitored.

The shapes of defined objects, which are preferably embodied as reference objects, are stored in the evaluation unit. These can be, in particular, objects which are stationarily disposed in relation to the device or objects which move along a predetermined path in the area to be monitored. The latter case has been realized, for example, with devices which are mounted on track-guided vehicles. In this case, the objects are represented by wall elements or walls, for example, along which the vehicle moves.

In the course of scanning the area to be monitored, the transmitted beam or possibly several transmitted beams from different transmitters are moved over the area to be monitored. In the process the transmitted beam is aimed at the object several times, corresponding to the dimensions to be detected. The measured position values registered in the receiver are compared in the evaluation unit with set values for the shape of the object. At least one tolerance band is defined for this, wherein the width of the tolerance band is selected as a function of the dispersion or spread of the measured values. The width of the tolerance band preferably has an order of magnitude corresponding to the standard deviation of the measured position values at the edge of the area to be monitored, i.e. at the place which is farthest away from the device.

An object having a corresponding shape is considered to be detected when a predetermined minimum number of measured position values are registered within the tolerance band.

The advantage of proceeding in this manner lies in that, for evaluating whether an object with the known shape is present, a plurality of measured position values, distributed over a spatial area, are used instead of individual measured position values. If respective individual measured position values would be compared with predetermined set values, erroneous individual measurements caused by fluctuations in the measuring values could have the result that an object present in the monitored area would not be detected.

In contrast thereto, with the method of the invention it is only required that a minimum number of measured position values fall within a predetermined range. The object can therefore be detected even if individual measured values are erroneous. However, this does not mean that the assurance of detection achieved with this method is less than with an individual measurement.

Instead, with a suitable selection of the tolerance band and the required minimum number N of measured position values within the tolerance band, the assurance of detection is considerably greater.

This is based on the fact that the probability of detection of an object is composed of multiplications of the probabilities of detecting it through individual measurements. Therefore, with a sufficiently large number of measured values used for detecting the object, it is possible to achieve very small error rates, typically of less than $10^{-3}$, during detection.

The detection probability can be further increased in that the measurement in accordance with the method of the invention is repeated over several periods. This is particularly practical if stationary objects are to be detected in an area.

In an advantageous manner it is possible to store the position values for the tolerance bands and thus also for the shapes of the objects in the evaluation unit in the form of spatially and/or temporally dependent variables. It is thus possible to detect respective objects at different places and with different orientations in the area to be monitored. The geometry data of the shape of the objects are suitably stored in the evaluation unit for the location or time dependent selection of the shapes. The absolute location and the orientation of the shape, however, are formed by time and position dependent variables.

A particular advantage of the method in accordance with the invention lies in that objects, hereinafter called reference objects, whose shapes are stored in the evaluation unit, can be differentiated from other objects with great assurance of detection, even if these are disposed closely in front of the reference objects.

This method can be advantageously employed in the field of personnel protection where the object often is to detect, with a high degree of assurance, a person standing closely in front of a wall.

BRIEF DESCRIPTION OF THE DRAWINGS

The invention will be explained with reference to the accompanying drawings, wherein:

FIG. 4a is a diagram illustrating a measurement being made of a wall and FIGS. 4b and 4c are graphs showing frequencies of measured values in the tolerance bands of FIG. 3 in the course of measuring the wall of FIG. 4a;

DETAILED DESCRIPTION OF THE PREFERRED EMBODIMENTS

Figure 1:
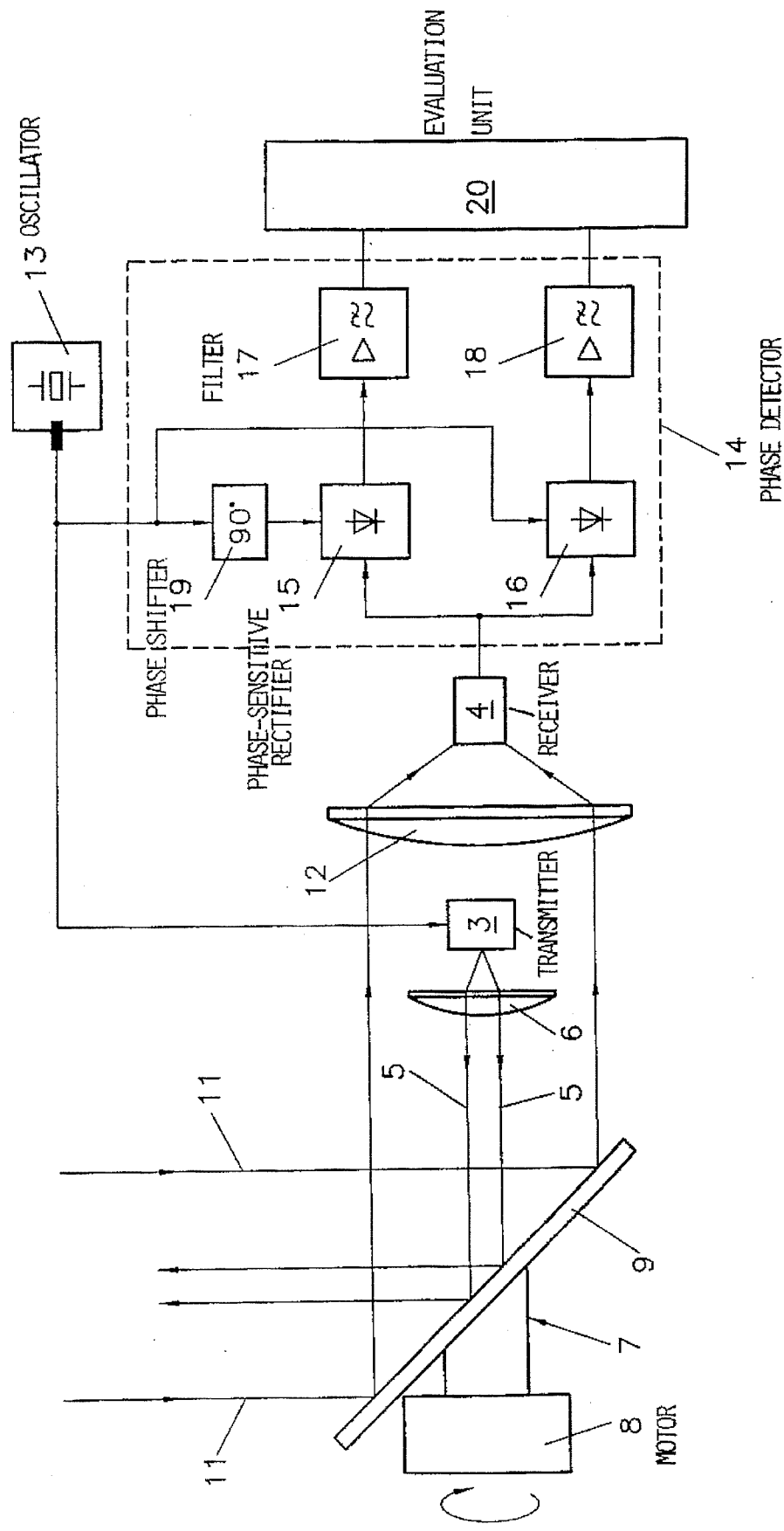
FIG. 1 is a block circuit diagram of a device for detecting objects according to the invention.

Referring to FIG. 1, there is shown an opto-electronic device 1 for detecting objects which includes a transmitter 3 and a receiver 4. Transmitter 3 emits a transmitted light beam 5 which is focused by an optical transmitting device 6. Transmitter 3 is suitably embodied as a laser diode. The focused transmitted light is deflected by a deflection device 7. Deflection device 7 is designed as a rotating turning mirror 9 driven by a motor 8 and for guiding the transmitted light beam 5 into an area 10 to be monitored (see FIG. 2) which in this case has a planar rectangular shape. Area 10 to be monitored is periodically scanned by rotation of deflection unit 7. Within one scan, that is within one rotation of deflection unit 7, area 10 to be monitored is completely scanned once by transmitted light beam 5.

Transmitted light beam 5 impinges the center of rotating mirror 9 and is guided to an object in area 10 by rotating mirror 9. The received light beams 11, which are diffusely reflected by an object in area 10, are supplied to receiver 4 from an edge area of rotating mirror 9 via an optical receiving device 12. Receiver 4 is preferably designed as a photodiode.

Alternatively, it is possible to employ with deflection unit 7 several transmitters 3 and receivers 4 disposed respectively next to each other for monitoring the area. In this case the device 1 is suitably embodied as a light grid.

For determining the position of objects in the area 10 to be monitored, the distance of an object from device 1 is measured by device 1. Measuring the distance is suitably performed in accordance with the known phase-measuring principle. The transmitted light is amplitude-modulated by a signal of frequency f produced by an oscillator 13. For determining the distance of an object from device 1, a phase difference between transmitted light beam 5 and received light beam 11 reflected by the object is measured and converted into a distance value. A phase detector 14 is connected downstream of receiver 4. There the transmitted signal supplied by oscillator 13 to transmitter 3 and the received signal present at the output of receiver 4 are converted into signals containing the phase difference between the transmitted and the received signals.

For this purpose the transmitted and received signals are supplied to phase-sensitive rectifiers 15, 16. The transmitted signal supplied to phase-sensitive rectifier 15 is phase-shifted by 90° in a phase-shifter 19. The signals at the outputs of the phase-sensitive rectifiers 15, 16 each contain a factor containing the phase difference, as well as an amplitude factor, which is a measurement of the intensity of the received light.

To eliminate the amplitude factors, the outputs of rectifiers 15, 16 are respectively supplied to low bandpass filters 17, 18, downstream of rectifier 15, 16, respectively. Signals of the shape $A \cdot \sin \Delta\phi$ and $A \cdot \cos \Delta\phi$ are present at the outputs of low bandpass filters 17, 18, wherein A is the amplitude factor and $\Delta\phi$ the phase difference between the transmitted and received signals. The quotient $\tan \Delta\phi$ of the two signals is formed in an evaluation unit 20, which has a calculation unit, preferably a microcontroller, by which the amplitude factor A is eliminated. With the modulation frequency f known, the distance value is subsequently calculated from the phase difference $\Delta\phi$.

The distance value is stored in the evaluation unit 20 together with an angle under which the transmitted light is transmitted, which is determined by means of an angle sensor, not shown in the drawings, disposed on deflection unit 7. This angle, together with the distance value, determines in the absolute position of the object 2 in the area to be monitored. In the course of spatial scanning, the elevational position of the transmitted light beam 5 is additionally read into and stored in evaluation device 20.

The method in accordance with the invention for the exemplary embodiment represented in FIG. 2 will now be explained. Opto-electronic device 1 is mounted on the front of a vehicle 21. The width of the vehicle is b. Vehicle 21, which preferably is embodied as a driverless transport vehicle, moves at a speed v in, for example, a factory shed.

To prevent collisions, a level rectangular area 10 of a width B and a length L in front of the vehicle 21 is monitored by opto-electronic device 1. The width B is suitably adapted to the vehicle width, since objects disposed laterally in respect to the vehicle do not result in collisions and therefore need not be monitored. However, since the measured values during detection of objects in the area 10 have a defined dispersion width because of system errors in device 1, the width B of area 10 is wider than the vehicle width b. It is thus achieved that an object 2 (see FIG. 3) in the area 10 to be monitored is also detected if the true distance between object 2 and device 1 vertically in respect to the direction of travel of vehicle 21 is less than b/2, because a distance greater than b/2 is being measured due to dispersion.

In the course of monitoring area 10 in front of the vehicle 21 it is particularly intended to differentiate reference objects 2' having a defined shape from other objects 2. In the instant exemplary embodiment, a reference object 2' is constituted by a flat wall or walls extending parallel to the direction of travel of vehicle 21. Reference object 2' suitably constitutes a stationary obstacle which can be circumnavigated without danger of collision when the speed and direction of vehicle 21 have been properly preset. This is the case particularly with the use of track-guided driverless transport vehicles in factory sheds. Such a reference object 2' must be differentiated from other objects 2, usually not stationary, which could collide with vehicle 21 upon entry into area 10. Such objects 2 can be persons in particular, who move inside area 10.

Figure 2:
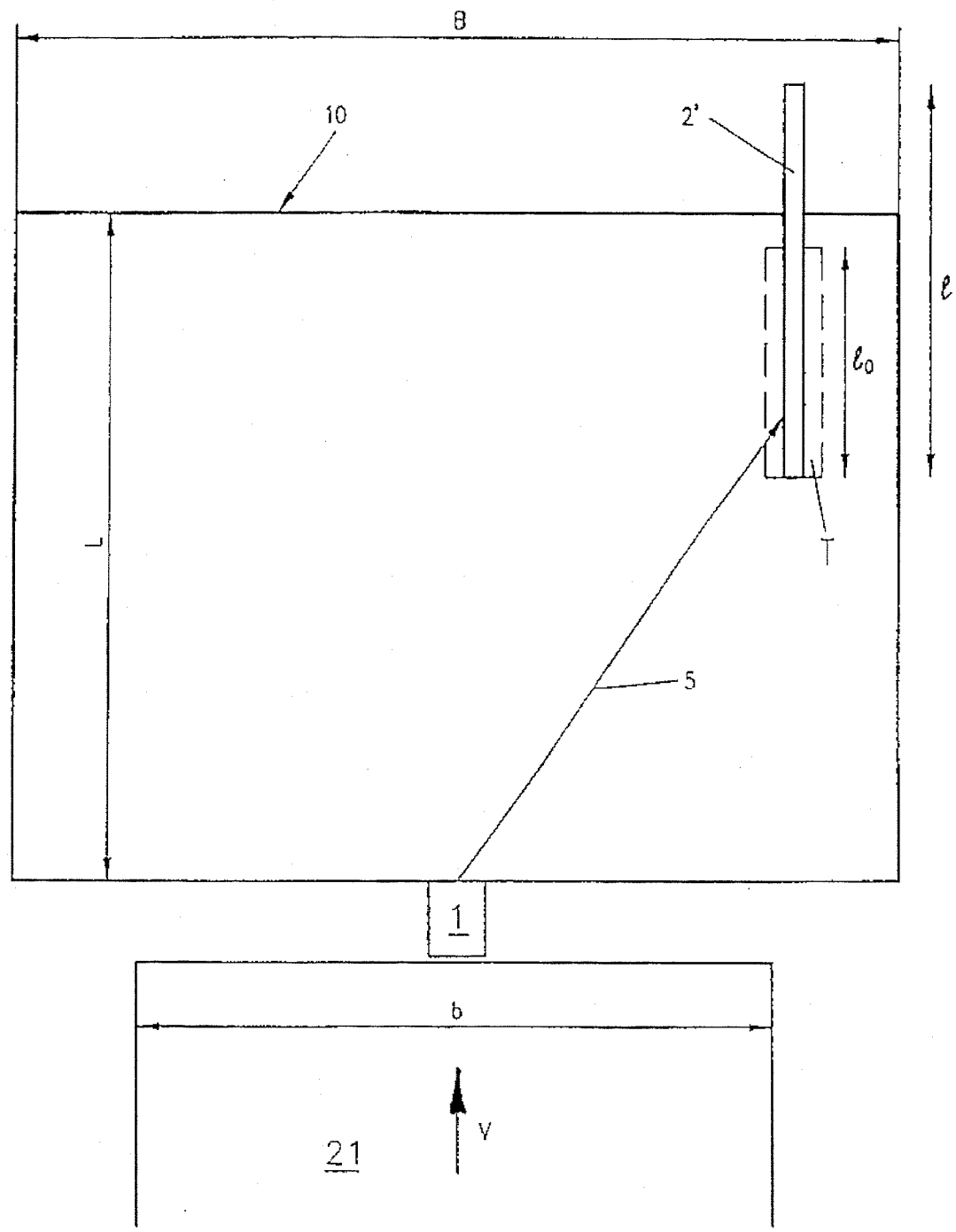
FIG. 2 is a schematic showing the device in accordance with FIG. 1 together with the area monitored by the device.

The measured position values of reference objects such as reference object 2' shown in FIG. 2 having a defined shape are stored as set values in evaluation unit 20. For static applications, i.e. for a stopped vehicle 21 (v=0), or with other applications such as monitoring access to machinery, the set values of fixed locations in area 10 can be preset.

In the instant exemplary embodiment, reference object 2' of preset shape consists of a wall element extending parallel to the direction of travel of vehicle 21. In this case the measured position values stored in evaluation unit 20 are temporally and spatially dependent variables. Accordingly, the set values are stored in evaluation unit 20 as a wall element of defined length 10 and of a preset orientation, namely parallel to the direction of travel of vehicle 21, wherein the starting and end points of the wall elements are variables. A flat surface of the wall element is suitably assumed, so that the shape of the wall element has the form of a straight line.

The measuring position values determined within one scan are stored in evaluation unit 20 for evaluating the measured values. Tolerance bands T, having a form adapted to the shape of reference object 2', are defined in evaluation unit 20 to differentiate the reference object 2' from other objects 2 (see FIG. 3). In the present case, tolerance bands T have the shape of rectangles of a predetermined length $l_0$. The position of tolerance band T is suitably selected so that the wall element is arranged in its center.

The width of tolerance band T suitably corresponds to the standard deviation of the measured position values for the wall element at the edge of area 10 which lay opposite device 1.

Reference object 2' is considered to have been detected if a minimum number N of the measured position values is registered within tolerance band T. In the simplest case, one tolerance band T is defined per reference object (FIG. 2). The amount N of the measured position values within the tolerance band is determined from the dimension of the tolerance band T and the local resolution of the device. A measurement for the local resolution is the number of distance measurements per angle segment. The more measurements of this type that are performed, the greater the number of measured points $N_0$ falling on the wall element.

Since the width of tolerance band T corresponds to the standard deviation of the measured position values at the edge of the area 10 to be monitored, for sufficiently large values of $N_0$, approximately 68% of the measured values impacting reference object 2' fall into the reference band T. Accordingly it is possible to detect a reference object 2' as such with a sufficiently large degree of assurance if, for example, more than 60% of the measured values $N_0$ for the reference object 2' fall within the tolerance band T. In this case the minimum number N for detecting a reference object 2' is $N=0.6\ N_0$.

The probability of an individual measuring point lying within the tolerance band results from the ratio of the standard deviation of the measurements and the width of the tolerance band. In the present case the probability is $P_1=0.68$.

The detection probability for the wall element is calculated by means of the Bernoulli equation in which the individual probabilities $P_1$ are entered, wherein all combinations of measured values, at least 60% of whose measurements fall into the tolerance band, contribute to the total probability.

Because the length $l_0$ of the tolerance band T (FIG. 2) has been preset, a wall element is detected as such if it has a minimum length of $l_0$. If the length l of a wall element is less than $l_0$, the minimum number N of the measured values is not attained and the object is not recognized as a wall element. Typical numerical values for the above mentioned parameters are $l_0=1$ m and $30<N<60$, wherein N depends on the position of the wall element in the area.

Since the absolute position of the reference object 2' is unknown when the measured position values are read into the evaluation unit 20, the position of tolerance band T is also unknown at the start of the evaluation. Accordingly, the tolerance band is displaced during the evaluation within the entire area 10 by a predefined step length which is less than the length $l_0$ or the width of the tolerance band T, until the wall element is centered in the tolerance band.

This process is especially advantageous when it is only necessary to monitor reference objects 2' of the same shape in the area 10 to be monitored and when the time available for evaluation is of sufficient length.

A frequent problem connected with the use of the optoelectronic device 1 in the field of personnel protection is that of detecting persons disposed in front of a wall as quickly as possible. This problem occurs in particular if vehicle 21 moves in narrow lanes defined by flat walls, into which persons could enter. Such a vehicle is often track-guided so that it can pass at a small distance from the walls. A person disposed in front of the wall would be caught by vehicle 21.

With applications of this type, the shapes of wall elements disposed parallel to the direction of travel of the vehicle 21 are again stored as set values in evaluation unit 20. Suitably, only one wall element of the predetermined length $l_0$ is stored in the evaluation unit 20 as reference object 2'.

Figure 3:
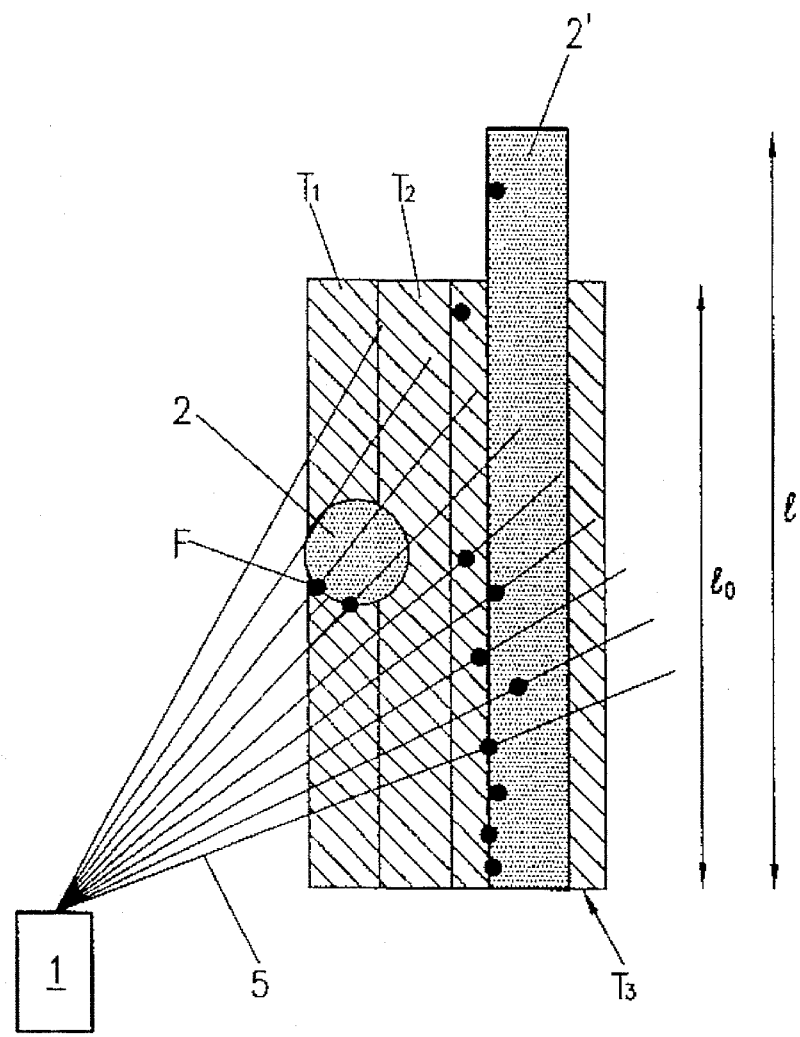
FIG. 3 is a diagram showing exemplary tolerance bands adapted to the shapes of reference objects.

In this case several tolerance bands $T_1$, $T_2$, $T_3$ are defined. As shown in FIG. 3, tolerance bands $T_1$, $T_2$, $T_3$ are in the shape of rectangles.

For evaluation, the measured values received within one scan are stored in evaluation unit 20. To assure as rapid an evaluation as possible, tolerance bands $T_1$, $T_2$, $T_3$ are not displaced over the entire area 10, instead they originate from a defined fixed point F. This fixed point F is formed by the measured value having the shortest distance transversely to the direction of travel, since it represents the greatest danger of a collision. Since objects 2 can move within area 10, the position of the fixed point F can be different for different scans.

Since the orientation of reference object 2', as a flat wall, is fixed extending parallel with the direction of travel, tolerance bands $T_1$, $T_2$, $T_3$ are aligned in the same direction in area 10, wherein at least one tolerance band $T_1$, $T_2$, $T_3$ originates at the fixed point.

Figure 4A:
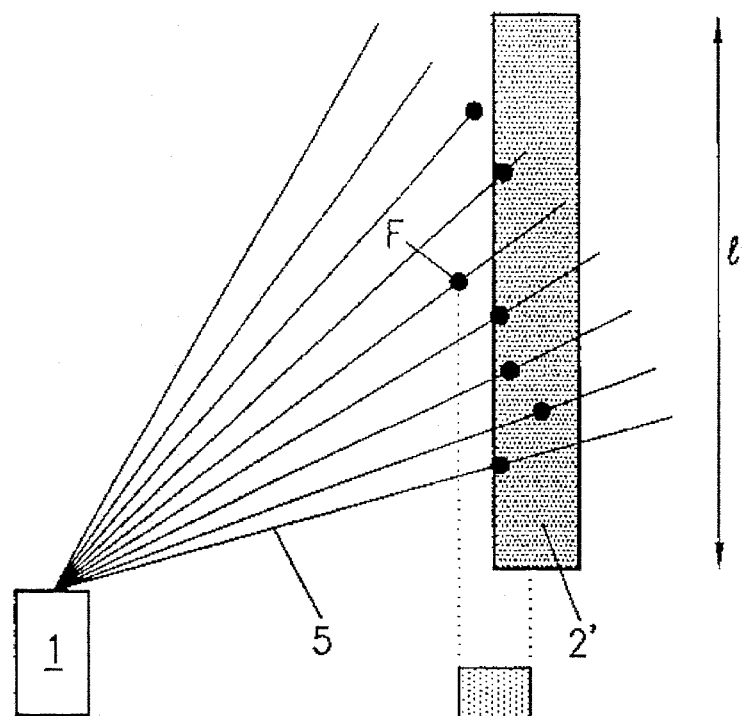
Figure 4B:
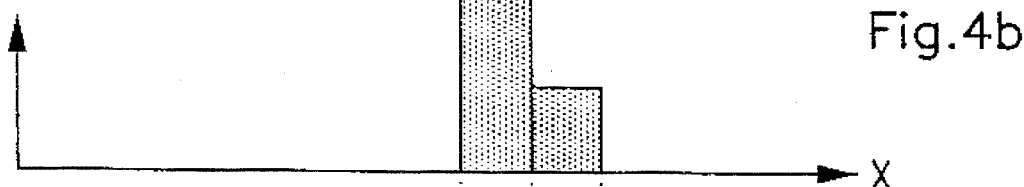
Figure 4C:
Figure 5A:
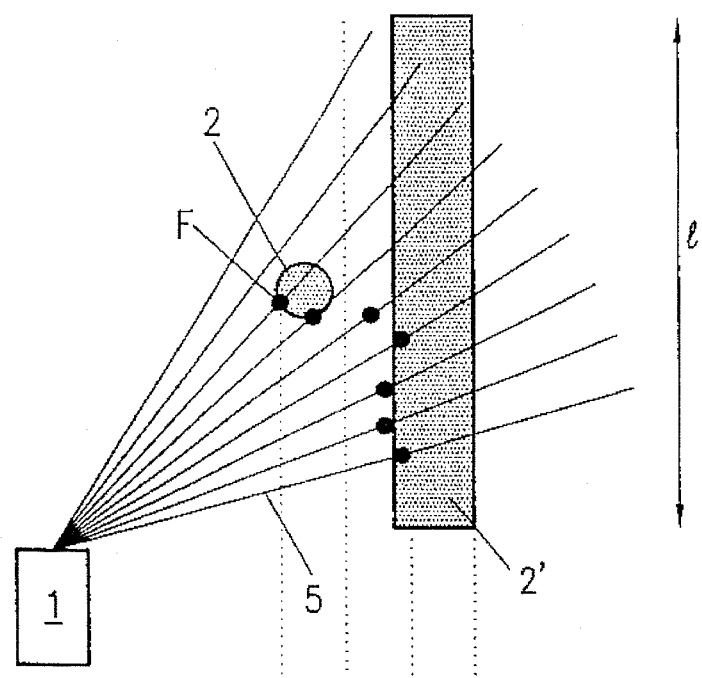
FIGS. 5a–5c are similar to FIGS. 4a–4c, respectively, with respect to measurements of an object disposed in front of a wall.
Figure 5B:
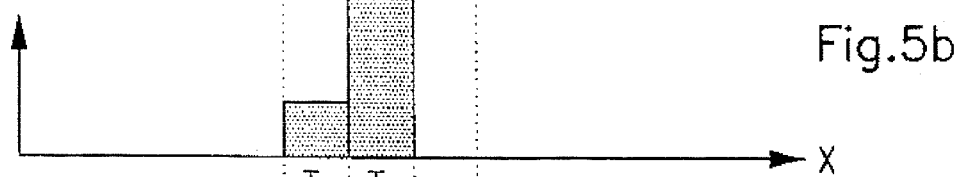
Figure 5C:
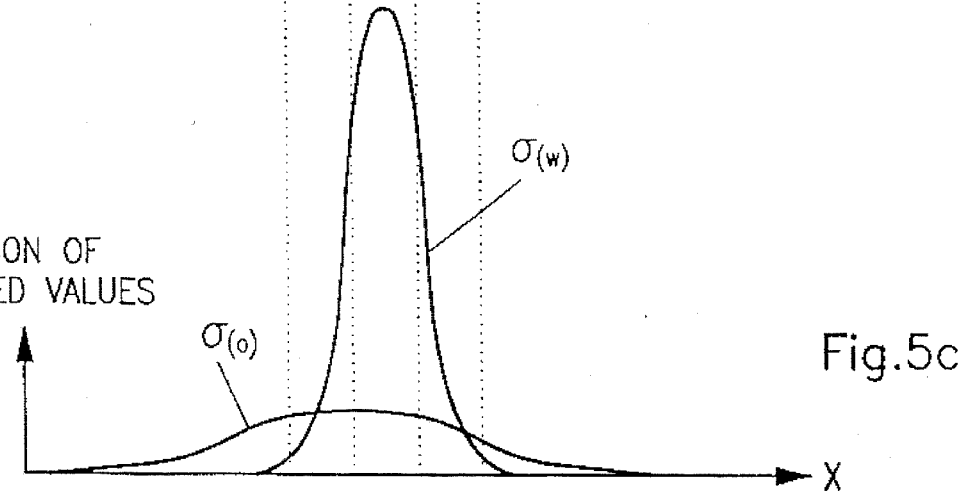

As shown in an advantageous embodiment in FIGS. 3 to 5, three rectangular tolerance bands $T_1$, $T_2$, $T_3$ are provided, wherein the first two tolerance bands $T_1$, $T_2$ are disposed adjoined inside a third tolerance band $T_3$. Tolerance band $T_3$ projects transversely to the direction of travel of vehicle 21 in the direction of the transmitted light beam 5 beyond the first two tolerance bands $T_1$, $T_2$, wherein the first and the third tolerance band $T_1$, $T_3$ originate from the fixed point F.

The shape of the tolerance bands $T_1$, $T_2$, $T_3$ as well as of reference object 2' represented by a wall element, and of object 2 disposed in front of the wall element, are shown in FIG. 3.

In the case shown in FIG. 3 and FIG. 5, an object 2 is disposed in front of the wall element, so that the fixed point F is represented by a measured position value stemming from the object 2. In contrast thereto, in FIG. 4 only a wall element is disposed in area 10 to be monitored, so that the fixed point F is formed by the measured position value stemming from the wall element and located closest to device 1.

The position of the tolerance bands $T_1$, $T_2$, $T_3$ in the direction of travel of the vehicle 21 is determined as follows. The initial point is the position of the fixed point F. First, the tolerance bands $T_1$, $T_2$, $T_3$ are extended in the direction of device 1 until no further measured values fall into the tolerance bands $T_1$, $T_2$, $T_3$, i.e. until the end of the wall element has been reached or until the preset length $l_0$ of the tolerance bands $T_1$, $T_2$, $T_3$ has been reached. In the first case the length of the tolerance bands $T_1$, $T_2$, $T_3$ is subsequently increased in the opposite direction until the total length $l_0$ has been attained.

The width of the first and second tolerance band $T_1$, $T_2$ essentially corresponds to the standard deviation of the measured values at the edge of area 10 to be monitored. The projection of the third tolerance band $T_3$ past the two first tolerance bands $T_1$, $T_2$ is of the same order of magnitude.

A wall element is considered to have been detected if at least N measured values fall into the third tolerance band $T_3$. The number N is suitably selected as already described above, namely $N=0.6\ N_0$, wherein $N_0$ corresponds to the number of the measuring points impinging on the wall element.

An object 2 possibly disposed in front of the wall element is differentiated by the number of measured values falling into the first and second tolerance band $T_1$, $T_2$. In this case a differentiation between the cases described in FIGS. 4 and 5 must be made.

The case where no object 2 is disposed in front of the wall element is described in connection with FIG. 4. In this case, corresponding to the dispersion σ (w) of the measured values of the wall element, considerably more measured values are registered in the first tolerance band $T_1$ than in the second tolerance band $T_2$.

FIG. 5 shows the case wherein an object 2 is disposed in front of the wall element. The standard deviation of the measured values for the wall σ (w) is relatively small. This is the case, for example, when the wall has a homogeneous surface which well reflects the transmitted light. In contrast to this, the standard deviation σ (o) of the object 2 is very large, i.e. the surface reflects only a small percentage of the transmitted light. In this case essentially only the measured values of the object 2, which are considerably less than the wall element, fall into the first tolerance band $T_1$.

Instead, the measured values of the wall element fall into the second tolerance band $T_2$. Thus, the number of the measured values in the second tolerance band $T_2$ is considerably greater than the number in the first tolerance band $T_1$.

It is accordingly possible on the basis of the evaluation of the number of measured values in the tolerance bands $T_1$, $T_2$ alone to determine whether an object 2 is disposed in front of the wall element.

The following rules are suitably defined for the quantitative evaluation.

1. As already described above, a wall element is present if $$A_3 \geq N$$

wherein $A_3$ is the number of the measured values in the third tolerance band $T_3$.

If this rule is not met, there is an object 2 present which is different from the wall element.

In order to avoid the effects of dispersion of the measured values, it can be demanded for detecting such objects 2 that:

$$A_3 > M,$$

wherein M is adapted to the dimensions of objects 2. For example, in the geometry represented in FIG. 3 and with the angular resolution of the device 1 shown, at least two measuring points fall on the object 2, so that the value 2 is suitably selected for M.

2. If the condition mentioned under 1. is met, i.e. a wall element has been detected in the third tolerance band $T_3$, the following rules are defined to differentiate the wall element from other objects 2:

$$A_1 < F_0 \cdot A_2, A_1 \geq M.$$

An object in front of a wall element is considered to have been detected if the number $A_1$ of the measured values in the first tolerance band $T_1$ is less than the product of the number $A_2$ of the measured values in the second tolerance band $T_2$ and of a factor $F_0$, wherein $F_0$ is suitably selected in the range $1 \leq F_0 \leq 3$. Suitably, $F_0 = 2$ is selected, so that a clear difference between the measured values in the tolerance bands $T_1$ and $T_2$ is required for detecting an object 2.

In addition, for detecting an object 2, it is again necessary to meet the condition $A_1 \geq M$, so that it is possible to exclude false measurements because of the dispersion of measured values.

The advantage of this method is that an object 2 in front of a wall element can be detected even if, as represented in FIG. 5, the distributive functions for the measured values of an object σ (o) and a wall element σ (w) overlap (FIG. 5).

This means that in accordance with a probability predefined by the distributive functions of the dispersion of the measured values as represented in FIG. 5, an object 2 could be erroneously identified as being in the wall element or vice versa in the course of an individual measurement. In contrast to this, with the method of the invention the detection assurance is considerably increased by the evaluation of as large a number of measured values as possible.

A further advantage of the method of the invention lies in that the detection assurance to be achieved can be set by suitable selection of the parameters of tolerance bands $T_1$, $T_2$, $T_3$ or of the parameters used in the rules. If, for example, the width of tolerance bands $T_1$, $T_2$, $T_3$ is selected in accordance with the standard deviation of the measured values of a wall element, with a sufficiently large number of the measuring points impinging on a wall element, approximately 68% of all measured values fall into tolerance bands $T_1$, $T_2$, $T_3$. If the width of tolerance bands $T_1$, $T_2$, $T_3$ is increased threefold, 99% of all measured values fall into the tolerance bands $T_1$, $T_2$, $T_3$, which increases the detection assurance accordingly.

However, the first and second tolerance bands $T_1$, $T_2$, in particular, cannot be selected to be arbitrarily wide. The upper limit is essentially defined by the minimum distance of object 2 from the wall element.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for detecting an object located in or entering into an area to be monitored with a device including a transmitter for emitting a beam, a receiver for receiving reflections of the beam from an object in an area to be monitored and an evaluation unit for producing measured position values from the received beam reflections, each measured position value representing a distance of the object from the device and an angular position of the object relative to an axis of the device, said method comprising:

projecting the emitted beam into the area to be monitored;

receiving reflections of the beam from an object in the area to be monitored;

producing measured position values from the received reflections, storing the measured position values in the evaluation unit;

detecting an object of a particular shape by steps including:

comparing the measured position values for the object with set values calculated in the evaluation unit for the particular shape of the object in a predetermined position in the area to be monitored; and indicating a detection of the object of particular shape when a minimum number N of the measured position values falls within at least one tolerance band T from the set values, wherein the minimum number N of the measured position values and a width of the tolerance band T are selected in the evaluation unit to be of the same order of magnitude as a dispersion of the measured position values; and detecting an object which, in a beam path of the emitted beam, is disposed in front of a reference object of a defined shape and wherein the dimensions of the object are less than the dimensions of the reference object by steps including:

defining a fixed point F in the course of detecting the object which has a measured position value representing the closest distance between the object and the device;

defining tolerance bands $T_1$, $T_2$, $T_3$ in the area to be monitored from the fixed point F in a direction toward greater distances from the device, wherein the tolerance bands $T_1$, $T_2$, $T_3$ have shapes adapted to the shape of the reference object;

storing a number of the measured position values falling into the respective tolerance bands $T_1$, $T_2$, $T_3$ in the evaluation unit;

indicating a detection of the object in front of the reference object when the number of measured position values in the tolerance band $T_1$ containing the fixed point F is less than the minimum number N for detecting the reference object and greater than a minimum number M, wherein M<N, and when the sum of the measured position values in the other tolerance bands $T_2$ or $T_3$ is greater than the minimum number N for detecting the reference object.

2. A method in accordance with claim 1, including spatially altering at least one of the set values of the measured position values for the shape of the object and the reference object stored in the evaluation unit.

3. A method in accordance with claim 1, including temporally altering at least one of the set values of the measured position values for the shape of the object and the reference object stored in the evaluation unit.

4. A method in accordance with claim 1, wherein the area to be monitored is a planar area, the reference object is a wall element positioned perpendicularly to the area and extending along a straight line, and the tolerance bands T, $T_1$, $T_2$, $T_3$ have the shape of rectangles having sides extending parallel with the wall elements with a length $l_0$, said method further including adapting the lengths $l_0$ of the sides of the rectangles extending parallel with the wall elements to a length l of the wall element.

5. A method in accordance with claim 4, wherein for detecting an object disposed in front of a wall element, said method includes providing the tolerance bands so that the first two tolerance bands $T_1$, $T_2$ adjoin each other and are disposed inside the third tolerance band $T_3$, and so that the first and the third tolerance bands $T_1$, $T_3$ originate at the fixed point F.

6. A method in accordance with claim 5, further including recognizing detection of a wall element when a number of measured position values $A_3$ in the third tolerance band $T_3$ is greater than a minimum number N for detecting the reference object, and when said recognizing step is performed, further recognizing detection of an object disposed in front of the wall element when the following conditions have been met for a number of the measured position values $A_1$ in the first tolerance band $T_1$ and for a number of measured position values $A_2$ in the second tolerance band $T_2$ $$A_1 < F_0 \cdot A_2 \quad A_1 \geq M$$

wherein $F_0$ is a numerical factor in a range $1 \leq F_0 \leq 3$.

7. A method in accordance with claim 1, wherein the tolerance bands T, $T_1$, $T_2$, $T_3$ have widths that fall within an order of magnitude of a standard deviation of the measured position values of an object at an edge of the area to be monitored.

8. A method in accordance with claim 1, including periodically scanning the area to be monitored by the transmitted beam and performing an evaluation of the measured position values within a length of one scanning period.

\* \* \* \* \*